United States Patent [19]

Karnowski

[11] Patent Number: 5,163,082
[45] Date of Patent: Nov. 10, 1992

[54] MEMORY MANAGEMENT METHODS AND APPARATUS FOR DIGITAL TELEPHONE ANSWERING DEVICES

[76] Inventor: Mark Karnowski, 7762 Devonwood Ave., Garden Grove, Calif. 92641

[21] Appl. No.: 592,673

[22] Filed: Oct. 4, 1990

[51] Int. Cl.⁵ .............................................. H04M 1/64
[52] U.S. Cl. ........................................ 379/88; 379/67; 379/89
[58] Field of Search ............................ 379/88, 89, 67; 364/200

[56] References Cited

U.S. PATENT DOCUMENTS 4,075,694  2/1978  Ericsson .............................. 364/200
4,794,638  12/1988  Millett .................................. 379/88
4,821,311  4/1989  Hashimoto .......................... 379/88

Primary Examiner—James L. Dwyer
Assistant Examiner—Fan Tsang
Attorney, Agent, or Firm—Lewis Anten

[57] ABSTRACT

A digital memory used by a digital telephone answering device to record messages, a method by which vacant memory space created by the deletion of a message interlying two saved messages is recovered for future message recording use. Available vacated memory is transferred to the top of memory while saved messages are moved to form a contiguous block in lower memory. The location of messages in the digital memory, and save/delete flag, are stored in an entry table for reference and memory management.

12 Claims, 2 Drawing Sheets

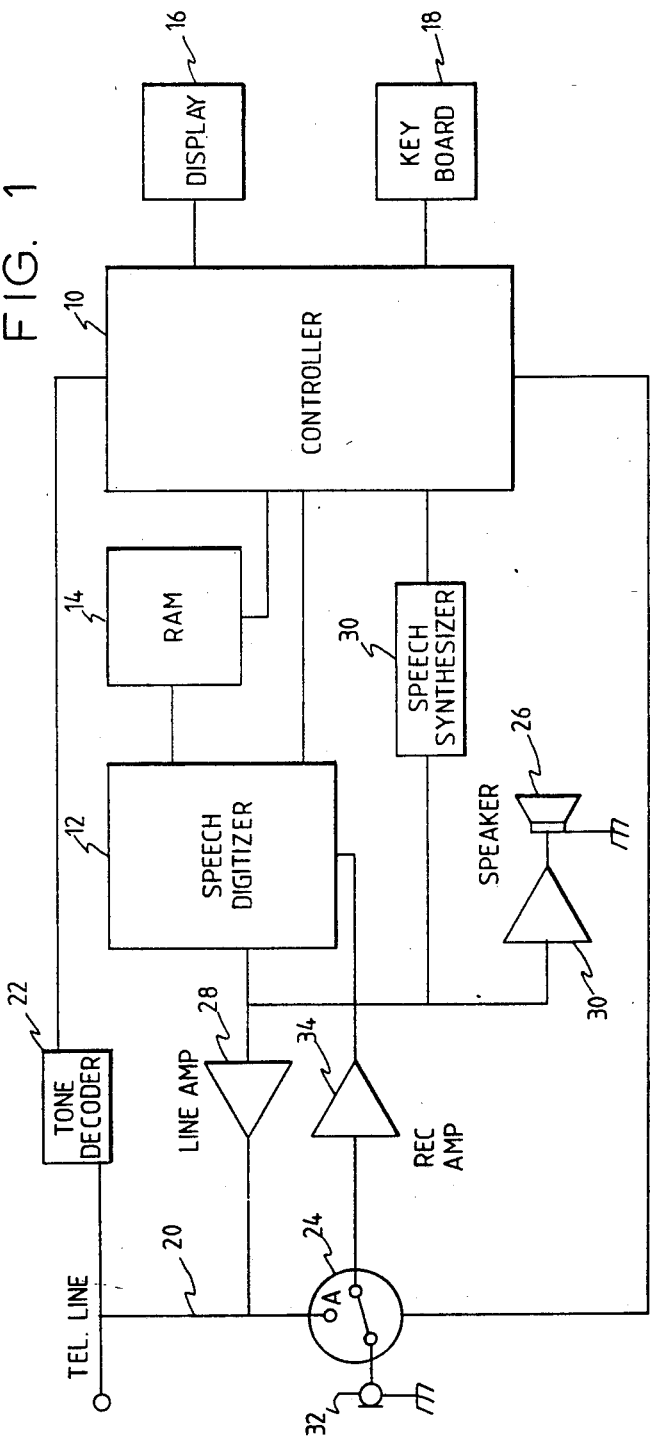

MEMORY MANAGEMENT METHODS AND APPARATUS FOR DIGITAL TELEPHONE ANSWERING DEVICES

BACKGROUND

1. Field of the Invention

The present invention relates to methods used for managing the memory used for storing messages in a digital telephone answering device, and more particularly to methods by which empty or unused gaps in memory may be removed to leave two types of contiguous memory: used and unused.

2. Description of the Prior Art

Telephone answering devices have become commonplace in recent years, and have taken such advanced forms as voice-mail networks. Most former telephone answering devices (TADs) were relegated to the use of cassette tapes for outgoing and incoming message recording and playback. Recently, advances in digital technology as applied to TADs have made possible the use of random access memory (RAM) to store and retrieve outgoing and incoming messages. Such digital TADs, or DTADs, require supporting circuitry that converts analog signals to digital signals and vice-versa. Beyond this supporting circuitry, DTADs are similar to regular, cassette-based TADs.

Arising with the use of RAM in DTADs, comes more flexibility of use. This flexibility includes the deletion of specific messages in random order while allowing the saving of other specific messages, also in random order. As the messages are stored digitally, the deletion of messages from memory and the transfer of messages between memory locations becomes greatly facilitated, especially compared to the previous cassette tape storage means.

When messages are deleted from RAM in random order, unused gaps of memory appear when a deletion is made between two saved messages. This memory gap cannot be used for further message storage as any outgoing or incoming message is of arbitrary length, depending on how long the person speaks. If the time available for the outgoing or incoming message is always the same, this may pose no problem. However, current technology allows TADs to record an incoming message for as long as the caller speaks. Further, as all messages are stored in sequential order in memory, the use of such a gap requires either overwriting part or all of a saved message, or the use of complex bookkeeping of pertinent memory locations so that outgoing or incoming messages saved in the space vacated by deleted messages can be saved piecemeal to preserve the saved messages. The latter alternative of piecemeal storage requires a great deal of "hopscotching" around message memory and ultimately leads to confusion within the controlling circuits.

With the advent of digital technology in the use of TADs, has also come increased expense. Digital circuitry requires greater design considerations as well as the use of more expensive components. For these reasons, the amount of available digital memory used in DTADs is not as great as the available cassette tape memory of older TADs. The approximately thirty minutes of memory present on cassette tape costs approximately ten cents per minute while five to ten minutes of digital memory present in DTADs costs about eight dollars per minute. Due to memory and cost limitations, the efficient use of this limited and expensive digital memory becomes an important consideration.

In Hashimoto's U.S. Pat. No. 4,821,311, issued Apr. 11, 1989, a DTAD is disclosed having a very limited incoming message recording time of about one and one-half minutes for about 1.5 megabits of memory. However, Hashimoto does allow the deletion of messages stored in digital memory in any order, while allowing other messages to be saved. In some embodiments, Hashimoto discloses memory apportionment by chip location, one chip per message. Recovery of deleted message memory is then implemented by moving the contents of a saved message into the memory chip of the deleted message. This results in some realization of efficient memory use, but the same could be accomplished by storing the order in which messages come in and the chips in which the messages are stored. Further, as there is a single message in each memory chip, a message longer than the time allotted is clipped at its end and a message shorter than the time allotted leaves some memory within the chip unused.

In other Hashimoto embodiments, memory apportionment is accomplished on a contiguous basis using CPU registers as pointers to memory locations. For the second case, Hashimoto does not disclose any explicit method for retrieving deleted memory space for efficient future use. Instead, mere analogy is used to the method for chip-wise message storage.

In U.S. Pat. No. 4,856,051 issued to Ohtawara et al. on Aug. 8, 1989, the only memory saved is memory accidentally used to record a silent incoming message, such as when the caller hangs up and the DTAD continues to record the telephone line signal. When such incoming message silence is detected, Ohtawara erases the message to recover the memory used. This only works for the latest message taken by the DTAD, and does not foresee memory recovery for deleted messages lying between two saved messages.

In Millet, U.S. Pat. No. 4,794,638, issued on Dec. 27, 1988, means for memory management are disclosed that use one chip per message and an array of pointers that keep track of the chronological order of the messages. Such means do not provide for the case of contiguous memory and may lose the use of some memory space when messages are stored that do not completely fill the allotted chip. Further, messages longer than the time allowed by an allotted chip do not have the overflow portion recorded.

Accordingly, there is a need for the efficient use of RAM when used in digital telephone answering machines for the recording of outgoing or incoming messages. Further, a need for the efficient use of DTAD RAM is present that maximizes the recovery of deleted message memory space so that the vacated memory space can be used to record future messages.

SUMMARY OF THE INVENTION

The present invention resides in a method for digital telephone answering devices by which memory space previously allotted and used by a deleted message can be recovered and made useable for future messages. A table is generated and initialized that corresponds to the RAM memory of the DTAD. When initialized, the table is set to save all outgoing messages and delete all incoming messages. The user may then choose to save some of the incoming messages and/or delete some of the outgoing messages. When the user is through reviewing the messages, a "garbage collection" scheme is implemented whereby the deleted message space is filled by the saved messages and the old saved message space is released for recording future messages. The table of messages in the message space provides the information necessary for preserving and discarding appropriate messages.

OBJECTS OF THE INVENTION

It is an object of the present invention to efficiently use all memory available for messages in a digital telephone answering device.

It is another object of the present invention to manage the available memory in a manner that results in all of the available memory being utilized productively.

It is still another object of the present invention to provide means for storing any number of incoming and outgoing messages in any chronological order, the limit being the available memory capacity.

It is yet another object of the present invention to enable the transfer and compaction of saved messages so that there is no unused memory space between the saved messages.

It is a further object of the present invention to prevent any fragmentation i.e., pockets of unused memory between messages.

It is yet another object of the present invention to accumulate the memory space that was previously occupied by deleted messages into one contiguous block of memory space available for recording future messages and to accumulate the memory space previously occupied by saved messages into one contiguous block for preservation of past messages.

It also another object of the present invention to provide a convenient voice activated means to acknowledge that a particular message has been saved or erased.

These and other objects of the invention will become apparent upon reading the specification and reviewing the accompanying drawings.

BRIEF DESCRIPTION OF THE DRAWINGS

FIG. 1 is a block diagram showing a digital telephone answering device DTAD upon which the method of the present invention may be implemented.

FIG. 2 shows schematically a portion of digital TAD memory undergoing the method of the present invention.

FIG. 2A shows the memory of the DTAD before message deletion.

FIG. 2B shows the same memory of the DTAD after message deletion.

FIG. 2C shows the same memory of the DTAD after the method of the present invention has completed retrieving the deleted message memory space.

DETAILED DESCRIPTION OF THE PREFERRED EMBODIMENTS

Figure 3:
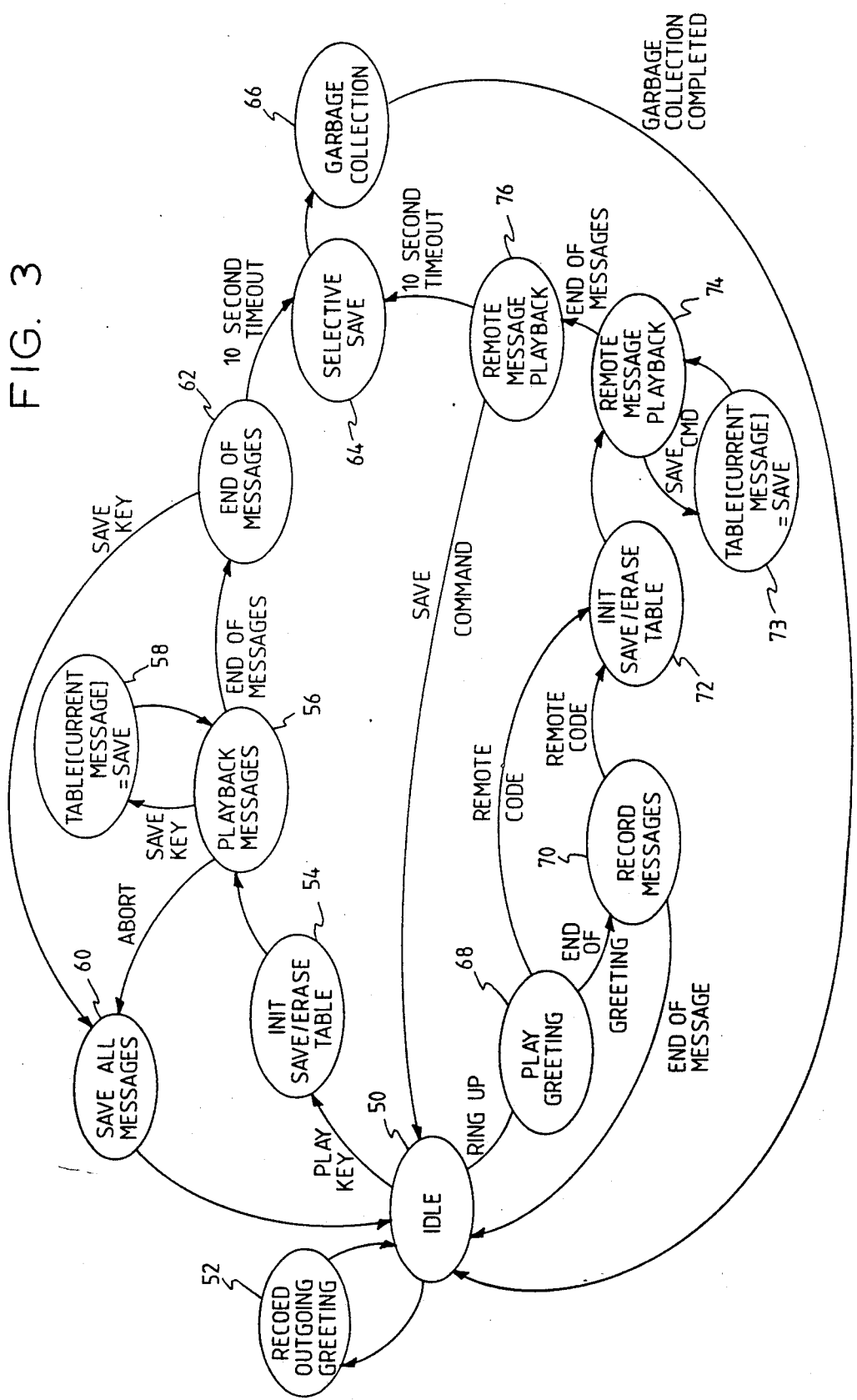
FIG. 3 is a state diagram showing schematically an overview of the memory management and selective save system of the present invention.

FIG. 1 shows a simplified version of a digital telephone answering device (digital TAD or DTAD) in a block diagram. A controller 10 is in input/output connection with a speech digitizer 12 and a source of random access memory (RAM) 14 used for storing messages. The controller 10 is also connected to a display 16, a keyboard 18, and the telephone line 20 through a tone decoder 22, and a switch 24 that is controllable by the controller 10. The speech digitizer 12 is also connected in an input/output relationship to the source of RAM 14. The speech digitizer 12 has an output coupled to the phone line 20 and a speaker 26. The phone line 20 is coupled to the output of speech digitizer 12 through a line amplifier 28. The speaker 26 is also coupled to the output of speech digitizer 12 through a speaker amplifier 30. The speech digitizer 12 also has an input coupled to the phone line 20 and a microphone 32, both through a recording amplifier 34. The controllable switch 24 uniquely selects between the phone line 20 and the microphone 32 for input to the speech digitizer 12. A tone decoder 22 is connected at its input to the phone line 20 and at its output to a controller 10 input to decode incoming tones on the phone line 20 for the controller 10. While synthesized speech prompts may be generated by the controller 10 through the speech synthesizer 12, it is also possible to have a speech synthesizer 36 dedicated for such purposes. Such a speech synthesizer is connected between the controller 10 and the line amplifier 28.

The controller 10 implements keyboard commands from keyboard 18 upon the speech digitizer 12 and RAM 14. These commands include the playing, recording, saving and deletion of messages. The controller 10 also implements the commands necessary for answering the phone line 20, delivering recorded outgoing messages, and recording the incoming message of the caller. Remote access by phone to the DTAD is also made possible by the controller 10.

Both the controller 10 and the speech digitizer 12 comprise conventional circuitry well-known in the art. The controller 10 may be a microprocessor of appropriate characteristics. The speech digitizer 12 may be an analog to digital and digital to analog signal converter which is also conventional and well-known.

Voice signals to be stored in or retrieved from RAM 14, such as incoming or outgoing messages, are converted from analog to digital signals, and vice-versa, by the speech digitizer 12. Voice signals serve as input to the speech digitizer 12 through the phone line 20 as incoming messages or through the microphone 32 as outgoing messages or other non-incoming messages. These analog signals of voice transmissions are converted into digital representation for storage into, and later playback from, the RAM 14. When messages stored in the RAM 14 are played back to the user of the DTAD, the digital information stored in the RAM 14 is converted by the speech digitizer 12 into analog voice signals for transmission over the phone line 20 or speaker 26.

The display 16 reveals information to the user regarding the status of the DTAD and is driven by the controller 10.

The controller 10 also exercises control over the speech digitizer 12 and RAM 14, coordinating the two so that outgoing greetings and incoming messages are coherently and properly stored and transmitted. It is the kind of control that the controller 10 exercises over RAM 14 with respect to deleted messages and their vacant memory space in RAM 14 to which the present invention is addressed.

The controller 10 is capable of receiving commands either through the keyboard 18 by the pressing of buttons or over the phone line 20 by means of tones decoded by the tone decoder 22. These commands include the saving or deletion of messages that have been stored in RAM 14.

FIG. 2A represents a portion of RAM 14 containing several messages. When a message is deleted that is at the end of RAM 14, the newly available space poses no problem as the only constraint upon the length of a new message is the physical memory space available in the RAM 14. A new message may be recorded at the end of the final saved message in the space vacated by the recently deleted message. However, as in FIG. 2B, when a message is deleted that is not at the end of RAM 14, the space made vacant by the message's deletion is not easily used as the message after the vacated space needs to be preserved in order to serve the needs of the DTAD user. As shown in FIG. 2C, in order to preserve the saved messages while allowing further use of memory space made available by the deletion of other messages, the controller 10 moves the saved messages into the memory space vacated by the deleted messages. The controller 10 also keeps track of the changes in RAM 14 so that memory space made vacant by the saved messages that have been moved to the deleted message memory space is made available for recording new messages.

Memory in RAM 14 is conventionally accessed by using the address or number of the memory storage location. When a message is stored in the RAM 14, it is sequentially stored in the lowest available memory addresses. One way of accomplishing this is by using a "pointer". A pointer is an address stored in memory, possibly a memory register internal to the controller 10. When a digital signal is to be written in RAM 14, the controller 10 writes the digital signal at the RAM 14 memory address located at the pointer. After the signal has been written, the controller 10 increments the pointer so that the addressed stored in it is the address of the next free memory address in RAM 14. The process can then be repeated when storing the next signal. The controller 10 can also keep track of where it is in RAM 14 through pointers.

When a message is played back, the stored message is accessed sequentially, or read, starting from the beginning of the message at a lower address to the end of the message at a higher address.

In order to coherently and properly manipulate the speech digitizer 12 and RAM 14, the controller 10 constructs a table to represent the messages that are stored in RAM 14. This table is stored inside the controller 10 or in another source of memory not shown. This table consists of entries that are the addresses, or memory locations, in RAM 14 of recorded messages. A flag associated with each address is also part of an entry. The flag is a single bit of the entry that represents the status of the message. If the message is to be deleted, then the flag for that message is set. If the message is to be saved, then the flag for that message is cleared.

When a message is recorded, the controller 10 stores in the table the beginning, and perhaps ending, address of that message. The ending address of an earlier message may be the beginning address of a later message. The table may also be used for other memory management purposes, such as the recording and playback of messages stored in digital memory, which are not directly related to the present invention.

When a message is chosen for deletion, the controller 10 maintains the location of that message in the table, but sets the associated flag. At an appropriately later time, a message with its flag set in the entry table can then be deleted. The controller 10 can then move the message immediately after the deleted message into the memory space vacated by the deleted message. Such message moving can be accomplished by copying the entire message to be moved into another source of memory all at once, and then copying the message back into RAM 14 at the point where the deleted message started, or the message can be moved by copying small portions of the message to be moved in a sequential manner into the memory space of the deleted message. These two methods are known in the art and easily executed.

Messages in memory locations higher than the moved message are themselves then moved into the memory space made vacant by moved messages in a like manner. In this way and as shown in FIGS. 2B and 2C, the space that was made available by the deletion of a message is moved away from the interior of memory used for saving messages to the end of the saved message memory space where the available space becomes contiguous in memory with unused RAM 14 at the end of all the saved messages.

By analogy, this process may be compared with removing of one book from the middle of a vertical stack of books. Each book represents a message. When a book is removed from the middle of the vertical stack, all the books above the one removed descend to take up the space formerly occupied by the removed book. After the book has been removed, the vertical stack appears almost the same as before the book was removed, except the space between the top of the book stack and the ceiling has been increased by the width of the removed book.

The number of messages that may be stored and deleted in this way is limited only by the physical memory available in the RAM 14, and the number of entries available in the table.

FIG. 3 shows a state diagram of a DTAD using the present invention. The default mode of the DTAD is the IDLE mode 50 as much of the time DTADs await commands from users or phone calls over the phone line 20.

Initially, a greeting is recorded by the user 52 that generally instructs callers to leave a message. When an outgoing greeting message is recorded, an entry is made in the table as to the starting location in RAM 14 of the outgoing greeting message. Multiple outgoing greeting messages are possible and within the contemplation of the present invention. Uses for different outgoing greeting messages arise from the use of distinctive ringing services where different phone lines ring the same phone in a different way, such as for a business and residence line or when two roommates share a phone that has different phone lines attached to it. The DTAD can detect the type of ring that occurs and play the outgoing greeting message appropriate for that ring/phone line.

Outgoing greeting messages are recognized by the DTAD and are flagged for saving as such for future reference, as are other non-incoming messages. The location of outgoing greeting messages and other non-incoming messages are recorded in the table and need not necessarily be contiguous or at the beginning of RAM 14. Outgoing greeting and other non-incoming messages are subject to the same memory retrieval process as are incoming caller messages and all are stored in the same RAM 14.

When an incoming phone call is answered and the DTAD takes the call, the message that the caller leaves is digitally recorded in RAM 14 and the message's location of the message in RAM 14 is recorded by the controller 10 in the table. The process is repeated for all other incoming messages, with the later incoming messages being stored in higher addresses of RAM 14 and their location in RAM 14 being stored in the table.

When a message is deleted, its entry in the table is temporarily retained, and messages higher in memory are moved into the deleted message's memory space. The table is then updated with the new locations of the saved messages.

As shown in FIG. 3, when the DTAD is in IDLE mode 50 and the play key is pressed, the table is initialized to save all outgoing and other non-incoming messages and to delete all incoming messages 54. This initialization is not implemented until the user is through reviewing the messages and may be changed in the course of that review. Messages recorded on the DTAD, in the RAM 14, are then played back to the user 56. At any time during the playing of a message, the user may press a SAVE key and the DTAD will inform him through the speech synthesizer 36 that the message has been saved, then continue on with message playback 58. When a message is saved, the table is modified and the entry for that message has its flag cleared so that the message will be saved. If for some reason the playback of messages is aborted, the table is modified so that all messages are saved and none are deleted 60. Accidental loss of a message is thereby avoided.

If playback goes as expected and the end of all the messages is reached, the user is informed that there are no more messages 62. At this point, the user may still press the save button to save all the messages. If ten seconds elapses after the end of messages has been reached, the table as modified is implemented with the outgoing greeting messages and the incoming messages that have been marked for saving being saved 64. All other messages are deleted, including outgoing greeting and other non-incoming messages that have had their flag status changed on the table. The method previously explained is then implemented with the space left open by the deleted messages being filled in with saved messages and the deleted message space being moved to the top of the RAM 14 memory space 66.

When the DTAD is called on the phone line 20, the DTAD answers the phone after a number of rings and plays the appropriate outgoing greeting message to the caller 68. At the end of the outgoing greeting message, the caller then leaves a message on the DTAD for later retrieval 70. Messages may be left on the DTAD so long as the RAM 14 has memory available for them and entries are available on the table. If during either the playing of the outgoing greeting message or the recording of the incoming message a remote code is given appropriate for the DTAD, the caller may remotely control the DTAD through tones entered over the phone line 20 and detected by the tone decoder 22. In the same manner as message playback by pressing the PLAY key, the caller may control the playback of messages with initially all outgoing and other non-incoming messages saved and all incoming messages deleted 72, 74. For callers remotely controlling the DTAD, tones control the DTAD instead of the keyboard 18. During playback, if the user presses the tone key on the phone representing the SAVE command the current message is flagged to be saved 73. The speech synthesizer 36 then informs the user that the message has been saved. If the playback is aborted, all messages are saved and upon reaching the end of the messages, executing a SAVE command by tone control saves all messages 76. Upon elapse of ten seconds, the table as modified is implemented with the deletion of messages that are flagged for deletion and the retrieval of memory space formerly occupied by deleted messages 64, 66.

Upon completing local or remote playback, and upon completion of recording a caller's incoming message, the DTAD returns to IDLE mode 50.

While the present invention has been described with regards to particular embodiments, it is recognized that additional variations of the present invention may be devised without departing from the inventive concept.

What is claimed is:

1. A method for retrieving unused memory space in digital memory from any location in said digital memory used by a digital telephone answering device (DTAD) for storing incoming and outgoing messages, the steps comprising:

generation by a controller of said DTAD of a table comprised of entries representing said incoming and outgoing messages stored in said digital memory, each of said entries being the location of an incoming or outgoing message in said digital memory used for storing incoming and outgoing messages and a flag;

setting said flag of certain entries of said table so that said certain messages represented by said flagged entries may be deleted from said digital memory;

deletion of all incoming and outgoing messages in said digital memory that have had their said entries in said table so flagged for deletion;

moving of remaining saved incoming and outgoing messages into the memory previously occupied by said deleted messages; and regeneration by said controller of said table containing entries, said entries being the new locations and flags of said saved messages in said digital memory.

2. The method for retrieving unused memory space of claim 1, wherein the step of moving remaining messages into the memory previously occupied by said deleted messages further comprises:

sequential movement of sub-portions of a saved message immediately higher than a location in said digital memory into vacant memory previously occupied by a deleted or saved message immediately below said location, said sequential movement maintaining the integrity of said immediately higher saved message and leaving no vacant memory between any two messages.

3. The method for retrieving unused memory space of claim 1, wherein said step of moving remaining messages into memory previously occupied by said deleted messages further comprises:

copying a saved message immediately higher than a location in said digital memory to a second source of digital memory;

copying said immediately higher saved message from said second source of digital memory back to said digital memory in vacant memory previously occupied by a deleted or saved message below said location in said digital memory; and maintaining message integrity throughout copying of said immediately higher saved message.

4. A method for efficient use of digital memory used for storing incoming and outgoing messages by a digital telephone answering device, the steps comprising:

conversion of incoming and outgoing analog voice message signals to digital voice message signals capable of being stored in said digital memory;

storage of new incoming and outgoing messages in said digital memory in a sequential manner with lower addresses of said digital memory being used for new message storage before higher addresses are used;

generation of an entry table by a controller of said digital telephone answering device, each entry of said entry table comprising an address location of an incoming or outgoing message in said digital memory and a flag, said address locations comprising an address in digital memory where a message begins, with a final entry of said entry table comprising an address location of said digital memory just above where a last message present in said digital memory ends and where a new message would begin and a flag;

selection of any incoming and outgoing message stored in said digital memory for deletion by setting said message's corresponding flag in said entry table;

deletion of all incoming and outgoing messages having their corresponding flags set in said entry table;

sequentially copying adjacent saved incoming and outgoing message portions into lowest possible available memory space of said digital memory that does not overwrite any of said digital memory uniquely storing message portions of saved messages, whereby said digital memory space previously storing recently deleted messages is filled with at least portions of saved messages previously stored in memory addresses higher than said deleted messages and said digital memory space previously storing saved message portions that have been copied to lower addresses in said digital memory are filled with at least portions of saved messages previously stored in memory addresses higher than said copied saved message portions, said sequential copying of adjacent stored message portions continuing until all of said digital memory containing deleted messages in lower memory addresses than any saved message is replaced by saved message portions and all saved messages are stored in said digital memory in one contiguous memory block with all memory space available for recording of new messages stored in said digital memory in another contiguous memory block; and updating said entry table after message deletion to accurately reflect all message locations and flags of messages stored in said digital memory.

5. The method for efficient digital memory use of claim 4, the steps further comprising:

using memory to store an address of said digital memory where a first incoming message portion will be next stored, said memory used to store said address then being appropriately incremented to store an address of said digital memory where a second incoming message portion will be next stored after storing said first incoming message portion in said digital memory.

6. The method for efficient digital memory use of claim 4, wherein said step of sequentially copying saved message portions into lowest possible available memory space deletes said flagged messages.

7. The method for efficient digital memory use of claim 4, the steps further comprising:

setting all digital memory above a final stored message in said contiguous block of saved messages to a preselected value.

8. A digital telephone answering device having circuitry for efficient management of digital memory's aid digital telephone answering device comprising:

a speech digitizer capable of converting an analog signal to a digital signal, and vice-versa;

a source of digital memory connected to said speech digitizer, said source of digital memory capable of storing digital signals generated by said speech digitizer and making available stored digital signals for conversion to analog signals by said speech digitizer;

a phone line connection connected to said speech digitizer, said phone line connection capable of connecting said circuitry to a telephone line; and a controller connected to said speech digitizer, said digital memory source, and said phone line connection, said controller for execution and implementation of commands, including commands for construction and maintenance of a table comprised of entries with each entry reflecting a location in said digital memory source of incoming and outgoing messages stored therein and a flag, commands for flagging of incoming and outgoing messages stored in said digital memory source to be deleted, commands for deletion of incoming and outgoing messages so flagged, and commands for moving available memory space in said digital memory vacated by deleted incoming and outgoing messages and for moving saved incoming and outgoing messages retained in said digital memory so that all memory space in said digital memory available for incoming and outgoing message storage is in one contiguous memory block and all memory space in said digital memory storing previously recorded saved incoming and outgoing messages is in another contiguous memory block.

9. The digital telephone answering device of claim 8, wherein said flagging of messages comprises the flagging of table entries of said messages to be deleted.

10. The digital telephone answering device of claim 8, wherein said source of digital memory comprises random access memory (RAM).

11. The digital telephone answering device of claim 8, wherein said commands implemented and executed by said controller comprise:

commands delivered to said controller by a keyboard;
commands internal to said controller; and
commands delivered to said controller over said phone connection.

12. The digital telephone answering device of claim 8, wherein said digital telephone answering device further comprises:

a display connected to said controller, said display for visual presentation of information relating to the status of said controller;

a keyboard connected to said controller, said keyboard for the entry of commands to said controller;

a line amplifier connected between said speech digitizer and said phone line connection, said line amplifier for the amplification of analog signals originating with said speech digitizer for transmission over said phone line connection;

a microphone coupled to said speech digitizer, said microphone for the production of electrical signals representing sound ambient to said microphone;

a recording amplifier connected between said speech digitizer and both said microphone and said phone line, said recording amplifier for the amplification of electrical signals generated by said microphone and said phone line;

a speaker coupled to said speech digitizer, said speaker for the production of sound from analog signals generated by said speech digitizer;

a speaker amplifier connected between said speech digitizer and said speaker, said speaker amplifier for the amplification of analog signals generated by said speech digitizer;

a tone decoder connected between said phone line and said controller, said tone decoder for the decoding of tones transmitted to said controller by said phone line; and a speech synthesizer connected between said phone line and said controller, said speech synthesizer for the synthesis of speech prompts transmitted by said controller to a user of said digital telephone answering device.

* * * * *